United States Patent
Kaigawa et al.

(10) Patent No.: US 6,793,602 B2
(45) Date of Patent: Sep. 21, 2004

(54) AUTOMATIC TRANSMISSION CONTROL DEVICE AND CONTROL METHOD

(75) Inventors: Masato Kaigawa, Toyota (JP); Yoji Takanami, Anjo (JP); Masao Saitou, Anjo (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/396,311

(22) Filed: Mar. 26, 2003

(65) Prior Publication Data

US 2003/0199355 A1 Oct. 23, 2003

(30) Foreign Application Priority Data

Apr. 17, 2002 (JP) ........................................ 2002-114850

(51) Int. Cl.[7] ............................................. F16H 31/00
(52) U.S. Cl. ...................... 475/123; 477/119; 477/149
(58) Field of Search ........................ 475/123; 477/119, 477/149

(56) References Cited

U.S. PATENT DOCUMENTS 4,991,464 A * 2/1991 Ishikawa et al. .............. 477/95
5,069,085 A * 12/1991 Iizuka ........................ 477/119

FOREIGN PATENT DOCUMENTS

JP            9-89092 A       3/1997

* cited by examiner

*Primary Examiner*—Dirk Wright
(74) *Attorney, Agent, or Firm*—Kenyon & Kenyon

(57) ABSTRACT

An automatic transmission control device controls multiple speed changes in which shifting from first speed to second speed occurs during shifting from second speed to first speed. The control device includes a shift lever position sensor, an ECT_ECU, and an AT linear solenoid. The ECT_ECU includes a circuit that detects multiple speed changes; a circuit that controls the AT linear solenoid such that an engagement pressure of an engaged first speed engine brake friction element sweeps down when multiple speed changes are detected; and a circuit that commands a shift to second speed once a predetermined time has passed since the detection of multiple speed changes assuming that the engagement pressure of the first speed engine brake friction element has sufficiently swept down.

16 Claims, 7 Drawing Sheets

FIG. 3

|   | C-1 | C-2 | C-3 | B-1 | B-2 | B-3 | B-4 | F-1 | F-2 | F-3 |
|---|---|---|---|---|---|---|---|---|---|---|
| P |   |   |   |   |   |   |   |   |   |   |
| REV |   |   | O | (O) |   |   | O | O |   |   |
| N |   |   |   |   |   |   |   |   |   |   |
| 1ST | O |   |   |   |   |   | (O) |   |   | O |
| 2ND | O |   |   |   | (O) | O |   | O | O |   |
| 3RD | O |   | O | (O) |   | ● |   | O |   |   |
| 4TH | O | O | ● |   |   | ● |   |   |   |   |
| 5TH |   | O | O | O |   | ● |   |   |   |   |

● : ENGAGED BUT NO TORQUE TRANSMISSION (O) : ONLY ENGAGED DURING ENGINE BRAKE

AUTOMATIC TRANSMISSION CONTROL DEVICE AND CONTROL METHOD

INCORPORATION BY REFERENCE

The disclosure of Japanese Patent Application No. 2002-114850 filed on Apr. 17, 2002 including the specification, drawings and abstract are incorporated herein by reference in its entirety.

BACKGROUND OF THE INVENTION

1. Field of the Invention

The invention relates to control of an automatic transmission mounted in a vehicle, and in particular, to control in the case where, during shifting towards a gear stage in which an engine brake friction element is engaged, a command is output that releases the engine brake friction element thereof.

2. Description of the Related Art

An automatic transmission mounted in a vehicle is structured by the combination of a torque converter to which an engine output is input, and a speed change gear mechanism driven by an output of the torque converter. The gear stage automatically shifts toward a predetermined gear stage in response to the demands of a driver or a driving state due to a switching of transmission path of the speed gear mechanism by means of selective engagement and release of a plurality of friction elements such as a clutch and a brake. In such an automatic transmission, an engine brake friction element, in addition to a friction element for changing speed, is provided. Normally, this engine brake friction element only transmits power during driving, and operates an engine brake during deceleration at a predetermined gear stage such as first range or second range by engaging it.

In such an automatic transmission, sometimes the gear stage is fixed at a predetermined gear stage (for example, a downshift from the current gear stage) in each range according to the operation of the driver. As operations for this purpose, the driver may incline a shift knob of the automatic transmission to the downshift side or turns on a sports mode switch, and in the case of a so-called sequential manual transmission, operate a change lever to the minus side or operate a manual switch provided in the steering wheel portion to the minus side. In the following description, these will be collectively described as operating a manual switch. For example, when the manual switch is turned on while traveling in the fourth speed of the D range, the gear stage is downshifted to the third speed and fixed. In addition, when the manual switch is turned on while traveling in the third speed of the S range, the gear stage is downshifted to the second speed and fixed. Also, the engine brake friction element is engaged and released by the operation of this manual switch in accordance with the speed change operation, thereby switching the actuation and release of the engine brake.

In such an automatic transmission, there are cases when multiple speed changes are performed through the operation of the manual switch, sudden changes in the driving state, or the like. Specifically, there are cases such as a command to shift to a second gear stage based upon a second speed change command is output while a speed change operation toward a first gear stage is being performed based upon a first speed change command, and the like. A control device for an automatic transmission that solves problems generated during such multiple speed changes is disclosed in Japanese Patent Laid-Open Publication No. 9-89092.

The automatic transmission control device disclosed in the publication controls an automatic transmission including an engine brake friction element that operates an engine brake during engagement. The control device includes a detecting circuit and a control circuit. The detecting circuit detects that multiple shift commands have been output that release the engine brake friction element during a speed change operation to a gear stage based upon a first speed change command in which the engine brake friction element is engaged and established. Also, in response to the multiple shift commands detected by the detecting circuit, the control circuit controls the automatic transmission such that the speed change operation based upon the second speed change command is not started until after the speed change operation based upon the first speed change command is finished. In addition, the control circuit controls the automatic transmission such that release of the engine brake friction element is forbidden until the speed change operation based upon the first speed change command is finished.

According to the automatic transmission control device disclosed in the publication, when a second speed change command (for example, shifting from first speed to second speed) is output during a speed change operation based upon a first speed change command (for example, shifting from second speed to first speed), the speed change operation based upon the second speed change command is started after the speed change operation based upon the first speed change command is finished, and release of the engaged first speed engine brake friction element is forbidden until the speed change operation based upon the first speed change command is finished. Therefore, according to the control device, once the speed change operation based upon the first speed change command is finished (engagement of the first speed engine brake friction element is complete), the second speed change operation is started. As a result, the first speed engine brake friction element is not released during engaging, and it is possible to reduce shift shock from the sudden inoperativeness of the first speed engine brake friction element.

Further, control different from that in the publication, which aborts the first speed change operation and moves on to the second speed change operation can also be considered. It is assumed that an engine brake friction element (B-4) generating a first speed engine brake and an engine brake friction element (B-2) generating a second speed engine brake are connected to a linear solenoid valve (SL2) via a shift valve. FIG. 6 shows a timing chart regarding a speed change operation from first speed to second speed in such a connected state. As shown in FIG. 6, after the speed change command in this control, the engine brake friction element (B-4) that generates the first speed engine brake is engaged, thereby generating the first speed engine brake. In addition, a timing chart is shown in FIG. 7 regarding a speed change operation in the case where a speed change from first speed to second speed is required during this speed change operation from second speed to first speed. As shown in FIG. 7, after the speed change command from second speed to first speed, in this control, the engine brake friction element (B-4) that generates the first speed engine brake is engaged, and that engagement is aborted while the first speed engine brake is being generated, at which time the linear solenoid (SL2) executes control engaging the engine brake friction element (B-2) that generates the second speed engine brake. Therefore, the engine brake friction element (B-2) that generates the second speed engine brake is engaged, thereby generating the second speed engine brake, while the friction element (B-4) generating the first speed engine brake is released, allowing rapid shifting from first speed to second speed.

However, according to the automatic transmission control device disclosed in the publication, the speed change operation based upon the second speed change command would have to wait until the speed change operation based upon the first speed change command is finished. Therefore, response to the shift demand from the driver is delayed.

Further, a control as shown in FIGS. 6 and 7, different from that in the publication, which aborts the first speed change operation and shifts to the second speed change operation can also be considered. By controlling the automatic transmission in such a manner, responsiveness to shift demand from the driver is improved. However, since the first speed engine brake friction element is released while it is being engaged, a shift shock is generated by the sudden inoperativeness of the first speed engine brake friction element.

SUMMARY OF THE INVENTION

It is an object of the invention to provide an automatic transmission control device and a control method which solve the above-mentioned problems and allows excellent response to shift demands from a driver of a vehicle with little shift shock in the automatic transmission during multiple speed changes.

The automatic transmission control device according to an aspect of the invention has an automatic transmission provided with a first gear stage including a plurality of engine brake friction elements operating engine brakes during engagement, and connected to a first shift valve in which a first engine brake friction element among the plurality of engine brake friction elements is engaged and established, and a second gear stage connected to the first shift valve in which a second engine brake friction element among the plurality of engine brake friction elements is engaged and established; a linear solenoid valve connected to the first shift valve; a detecting portion that detects shift demands to the first gear stage or the second gear stage; and a control portion engaging and releasing the first engine brake friction element and the second engine brake friction element through the linear solenoid valve. In addition, the control portion includes a valve control portion that controls the solenoid valve such that a time reduction rate of an output oil pressure from the linear solenoid valve to the shift valve becomes equal to or less than a predetermined rate in response to the detection of a shift demand for a shift from the second gear stage to the first gear stage, and a command portion for commanding the automatic transmission with a shift command from the second gear stage to the first gear stage in response to the passage of a predetermined time since the detection of the shift demand from the second gear stage to the first gear stage.

BRIEF DESCRIPTION OF THE DRAWINGS

FIG. 3 is an operation diagram for each gear stage of the automatic transmission according to the embodiment of the invention;

DETAILED DESCRIPTION OF THE PREFERRED EMBODIMENT

Hereafter, an embodiment of the invention will be described with reference to the accompanying drawings. In the description below, identical numerals denote identical parts with identical names and functions. Accordingly, detailed descriptions regarding these will not be repeated.

Figure 1:
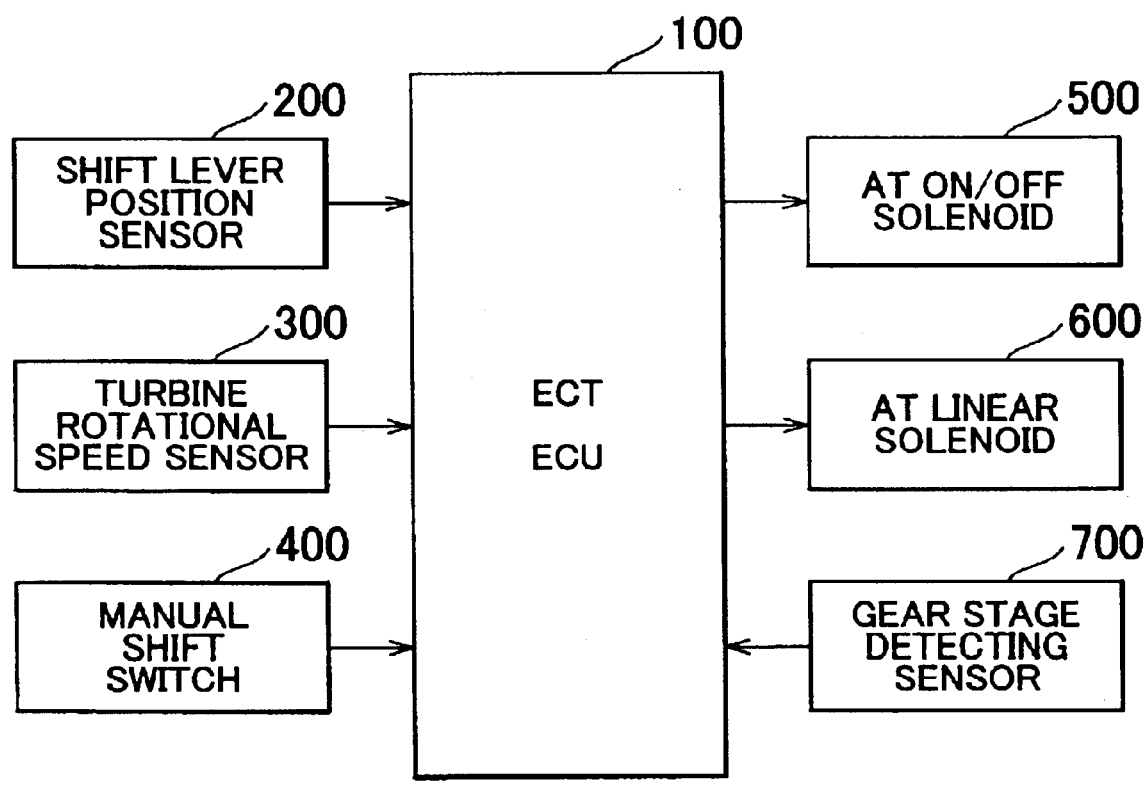
FIG. 1 is a control block diagram of a system including an automatic transmission control device according to an embodiment of the invention.

FIG. 1 is a control block diagram of automatic transmission including an ECT_ECU100 that realizes an automatic transmission control device according to an embodiment. As shown in FIG. 1, this system ECT_ECU100 as a controlling means, is a controller that controls the automatic transmission. The ECT_ECU100 includes a memory storing programs, various data and the like, a CPU (Central Processing Unit) executing programs stored in the memory, a clock generating a basic operation frequency, a timer measuring time passed, and so forth.

Input signal wires from a shift lever position detecting sensor 200, a turbine rotational speed sensor 300, a manual shift switch 400, and a gear stage detecting sensor 700 are connected to the ECT_ECU100. The shift lever position sensor 200 detects a position of a shift lever of the automatic transmission operated by the vehicle driver. The turbine rotational speed sensor 300 as a rotational speed detecting means, detects the output rotational speed (=AT input shaft rotational speed) of the torque converter of the automatic transmission. The manual shift switch 400 detects a manual speed change command from the vehicle driver. The gear stage detecting sensor 700 detects the current gear stage of the automatic transmission. An output signal wire from the ECT_ECU100 is connected to an AT on/off solenoid 500 and an AT linear solenoid 600. A speed change command signal is output from the ECT_ECU100 which includes commanding means, to the AT on/off solenoid 500 and the AT linear solenoid 600, performing a speed change in the automatic transmission.

The speed gear stage of the automatic transmission shall be a forward five speed stage. The shift lever position sensor 200 detects the position of speed change shifts (for example, L range, 2 range, 3 range, 4 range, D range, N range, REV range, and P range) corresponding to this forward five speed gear stage. The manual shift switch 400 is provided, for example, near the shift lever or in the steering wheel, and detects two types of commands, either a speed change command for a higher speed stage or a speed change command for a lower speed stage.

The current gear stage is detected by the gear stage detecting sensor 700. However, the current gear stage may be detected based upon a speed change command signal output by the ECT_ECU100 instead of the gear stage detecting sensor 700. For example, the ECT_ECU100 may be designed such that after it outputs a speed change command signal to the AT on/off solenoid 500 and the AT linear solenoid 600, it detects that a predetermined amount of time has passed, determines the speed change operation as finished, and determines the current gear stage.

The ECT_ECU100 as a detecting means, according to the embodiment detects multiple shift demands from the vehicle driver based upon input signals from the shift lever position sensor 200 and the manual shift switch 400. Then, the ECT_ECU100 corresponds to the turbine rotational speed and the state of the automatic transmission at that time, and controls the speed change operation based upon the shift demand generated first, then controls the speed change operation based upon the shift demand generated afterwards.

Figure 2:
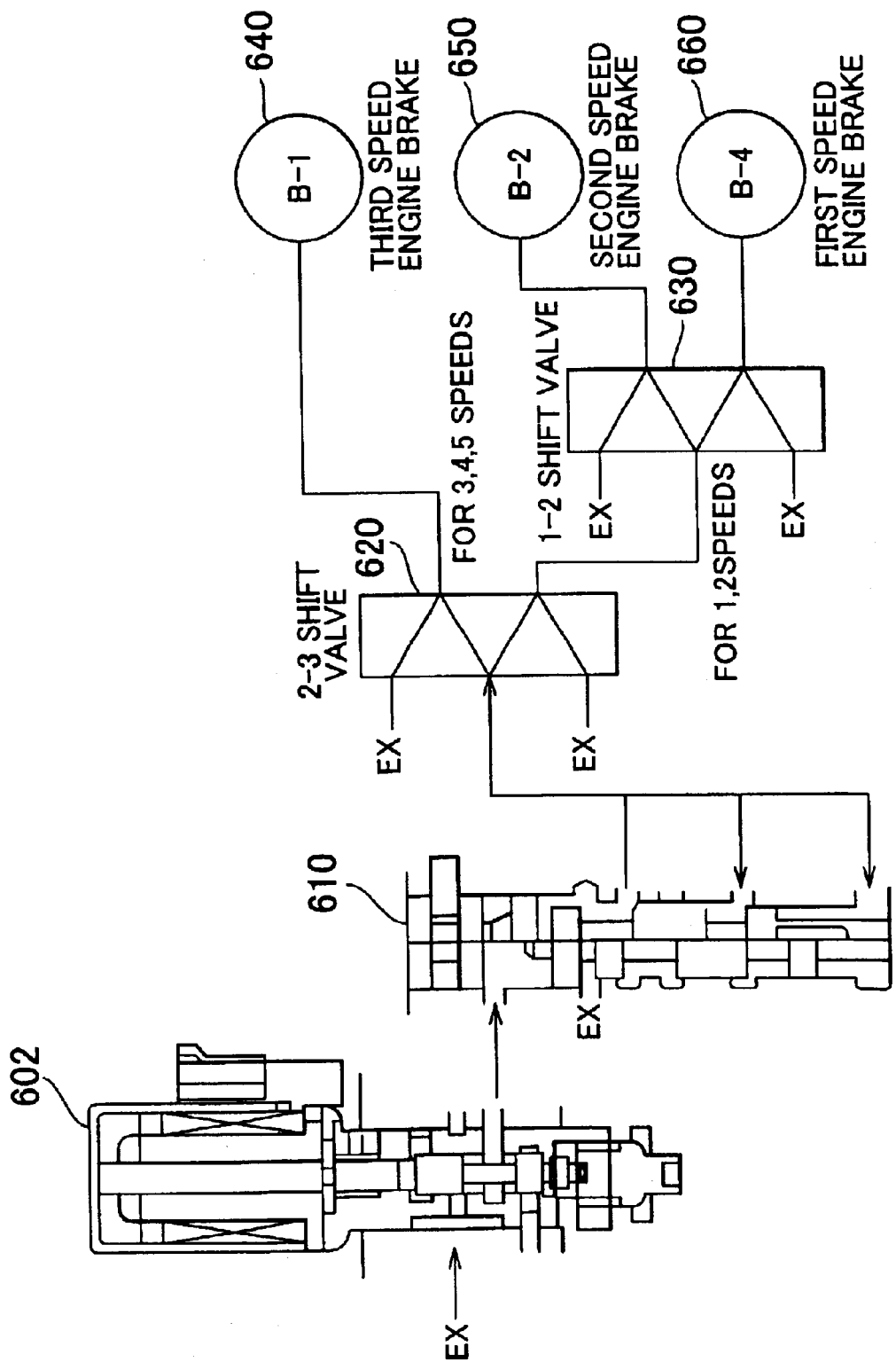
FIG. 2 is an oil pressure circuit diagram of the automatic transmission according to the embodiment of the invention.

FIG. 2 is an oil pressure circuit diagram of the automatic transmission. As shown in FIG. 2, in this automatic transmission, an engine brake friction element (B-4) 660 that generates a first speed engine brake and an engine brake friction element (B-2) 650 that generates a second speed engine brake are connected to a linear solenoid valve (SL2) 602 via a 1–2 shift valve 630, a 2–3 shift valve 620, and a brake control valve 610. In addition, an engine brake friction element (B-1) 640 that generates a third speed engine brake is connected to the linear solenoid valve (SL2) 602 via the 2–3 shift valve 620 and the brake control valve 610. The 1–2 shift valve 630 switches an oil pressure route such that oil pressure is supplied to either one of the engine brake friction element (B-4) 660 that generates the first speed engine brake or the engine brake friction element (B-2) 650 that generates the second speed engine brake. The 2–3 shift valve 620 switches an oil pressure route such that oil pressure is supplied to either one of the engine brake friction element (B-1) 640 that generates the third speed engine brake or the 1–2 shift valve 630. The brake control valve 610 magnifies signal pressure (pilot pressure) supplied from the linear solenoid valve (SL2), and supplies the magnified oil pressure to the 2–3 shift valve 620. The linear solenoid valve (SL2) 602 supplies the signal pressure to the brake control valve 610 in response to the electric current value indicated by the ECT_ECU100 which includes a valve controlling means. In this linear solenoid valve (SL2) 602, the indicated electric current value and the output oil pressure have nearly linear characteristics.

An operation diagram of the automatic transmission will be described with reference to FIG. 3. As shown in FIG. 3, this operation diagram shows whether a clutch or brake, which are friction elements, is engaged or released at a gear stage. With regard to engine brake friction elements, the engine brake friction element (B-4) 660 is engaged in first speed, and the engine brake friction element (B-2) 650 is engaged in second speed.

Figure 4:
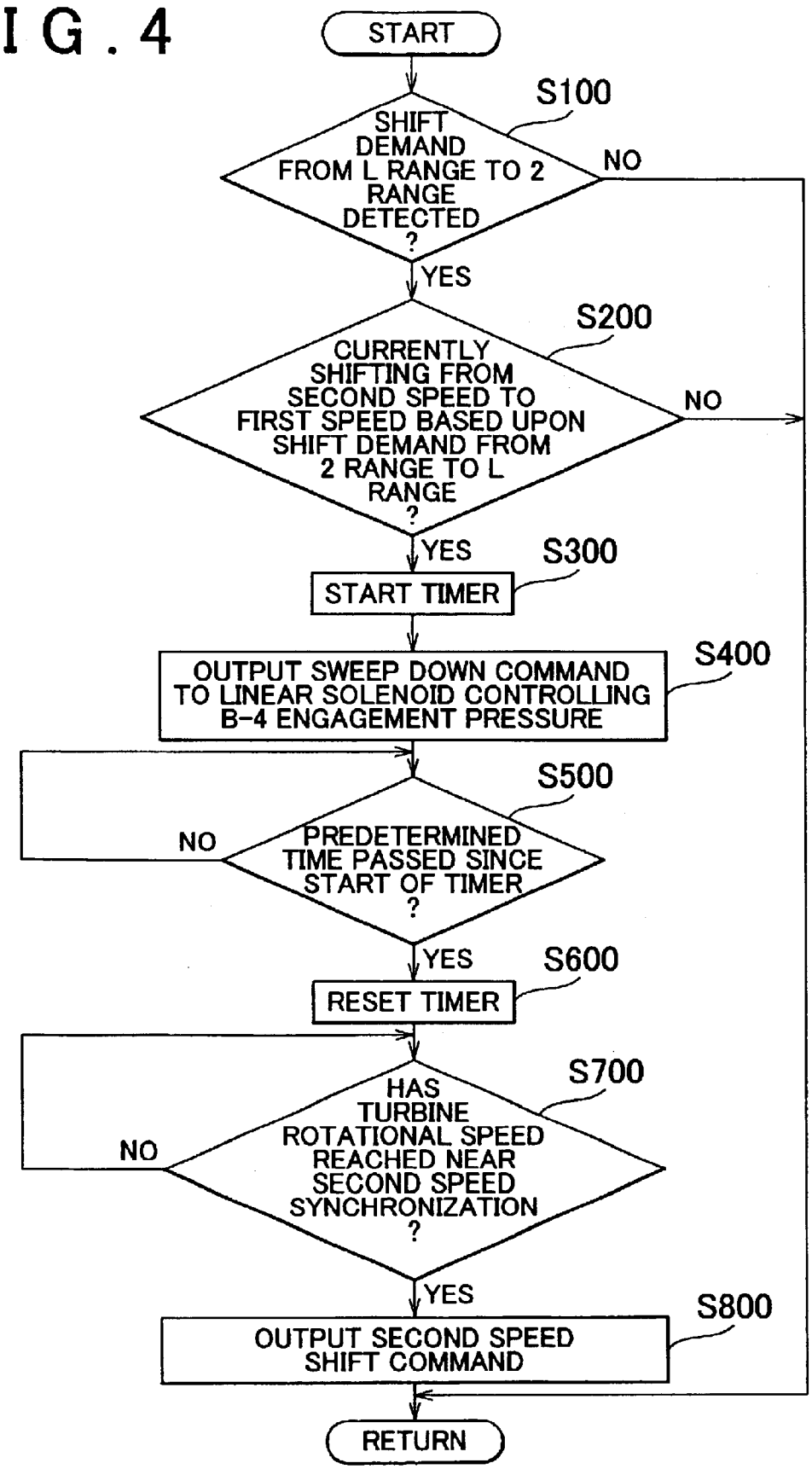
FIG. 4 is a flow chart showing a control structure of a program executed in the control device of the automatic transmission according to the embodiment of the invention.

A control structure of a program executed by the ECT_ECU100, which realizes the control device of the automatic transmission according to the embodiment, will be described with reference to FIG. 4.

In step 100, the ECT_ECU100 determines whether a shift demand for a shift from L range to 2 range has been detected. At this time, the ECT_ECU100 determines whether a shift demand has been detected based upon an input signal input from the shift lever position sensor 200. If a shift demand for a shift from L range to 2 range has been detected (YES in step 100), the process proceeds to step 200. If not (NO in step 100), this process ends.

In step 200, the ECT_ECU100 determines whether the automatic transmission is in the midst of shifting from second speed to first speed based upon a shift demand for a shift from 2 range to L range. At this time, the ECT_ECU100 determines whether the automatic transmission is in the midst of shifting from second speed to first speed based upon the state of the current gear stage input from the gear stage detecting sensor 700 and the time that has passed since the ECT_ECU100 output a signal to the AT on/off solenoid 500 and the AT linear solenoid 600. If the automatic transmission is in the midst of shifting from second speed to first speed based upon the shift demand from 2 range to L range (YES in step 200), the process proceeds to step 300. If not (NO in step 200), this process ends.

In step 300, the ECT_ECU100 starts a timer. This timer is installed in an interior portion of the ECT_ECU100. In step 400, the ECT_ECU100 outputs a sweep down command to the linear solenoid (SL2) 602 currently controlling a B-4 engagement pressure. At this time, the ECT_ECU100 outputs a set electric current value such that a signal pressure output from the linear solenoid (SL2) 602 realizes a predetermined time reduction rate.

In step 500, the ECT_ECU100 determines whether a predetermined time has passed since the start of the timer. This predetermined time is set to the time until the first speed engine brake friction element (B-4) 660 reaches an approximate released state after an engaged state based upon the time reduction rate of the signal pressure output from the linear solenoid (SL2) 602. If the predetermined amount of time has passed since the start of the timer (YES in step 500), the process proceeds to step 600. If not (NO in step 500), the process returns to step 500 and waits until the predetermined amount of time since the start of the timer has passed.

In step 600, the ECT_ECU100 resets the timer. In step 700, the ECT_ECU100 determines whether the turbine rotational speed has reached near synchronization with second speed. At this time, the ECT_ECU100 determines whether the turbine rotational speed has reached within ±10% synchronization with second speed based upon the input signal input from the turbine rotational speed sensor. If the turbine rotational speed has reached near synchronization with second speed (YES in step 700), the process proceeds to step 800. If not (NO in step 700), the process returns to step 700 and waits until the turbine rotational speed has reached near synchronization with second speed.

In step 800, the ECT_ECU100 outputs a second speed shift command to the AT on/off solenoid 500 and the AT linear solenoid 600.

An operation of the ECT_ECU100 that realizes the automatic transmission control device according to the embodiment will be described based on such a structure and flow chart as described above. When a shift demand for a shift from L range to 3 range is detected (YES in step 100), the ECT_ECU100 determines whether the automatic transmission is in the midst of shifting from second speed to first speed based upon a shift demand for a shift from 2 range to L range. If the automatic transmission is in the midst of shifting from second speed to first speed (YES in step 200), then the timer is started (step 300).

A sweep down command is output by the ECT_ECU100 to the linear solenoid (SL2) controlling the B-4 engagement pressure (step 400). If a predetermined amount of time has passed since the start of the timer (YES in step 500), the timer is reset (step 600), and it is determined whether the turbine rotational speed has reached near synchronization with second speed (step 700). If the turbine rotational speed has reached near synchronization with second speed (YES in step 700), a second speed shift command is output (step 800).

Figure 5:
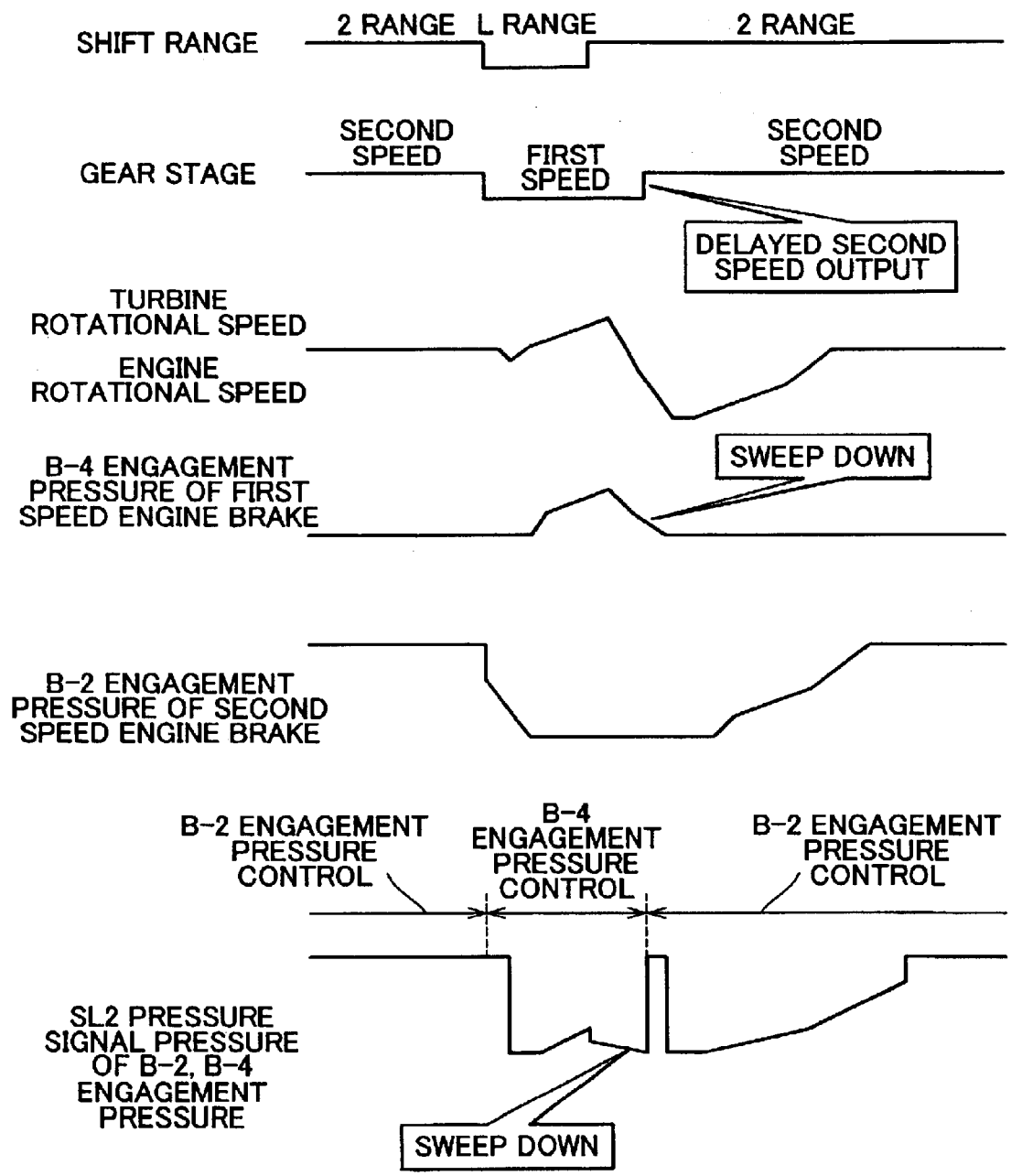
FIG. 5 is a timing chart describing an operation example of the control device of the automatic transmission according to the embodiment of the invention.
Figure 6:
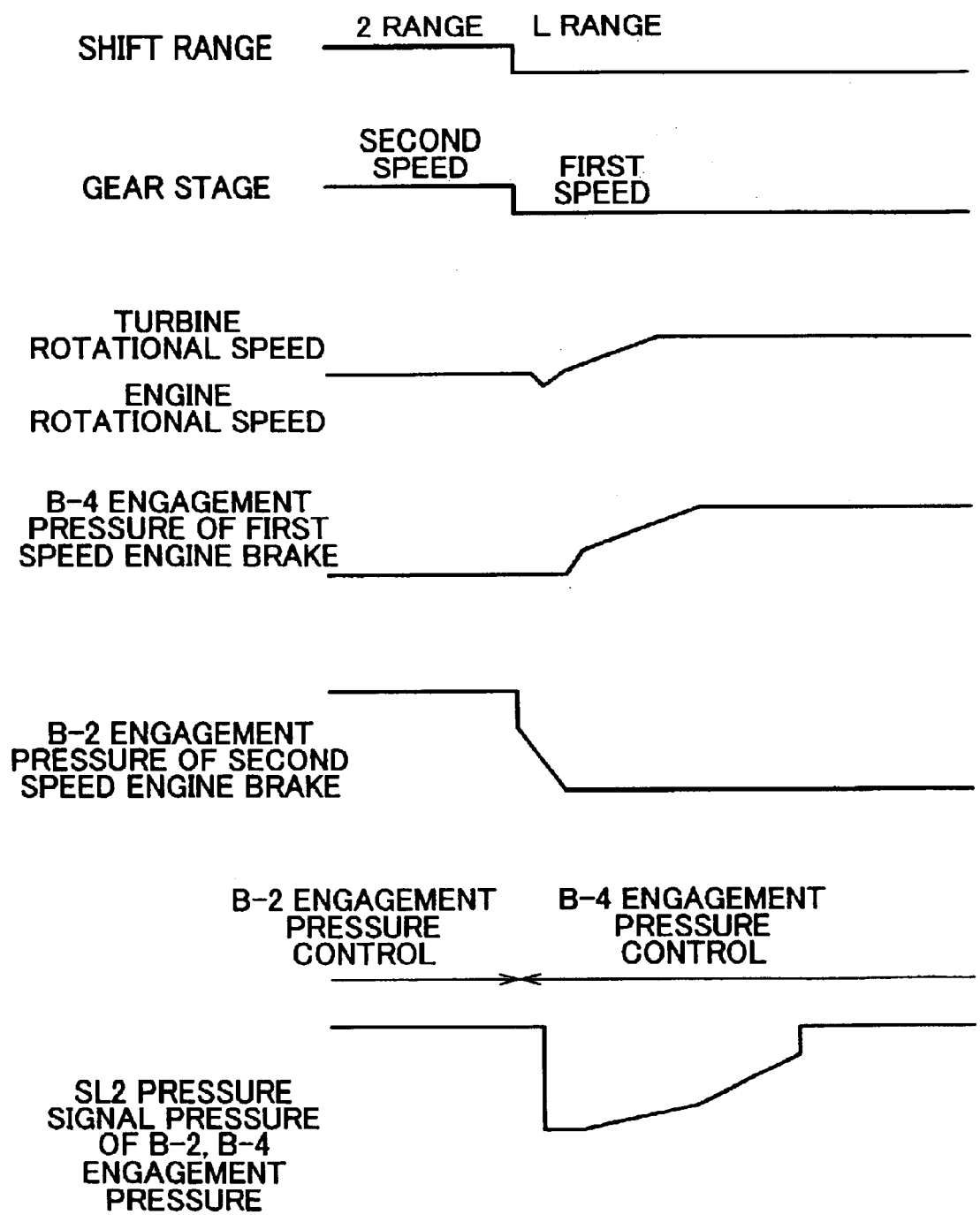
FIG. 6 is a timing chart (1) describing an operation example of a control device of an automatic transmission according to a related art.
Figure 7:
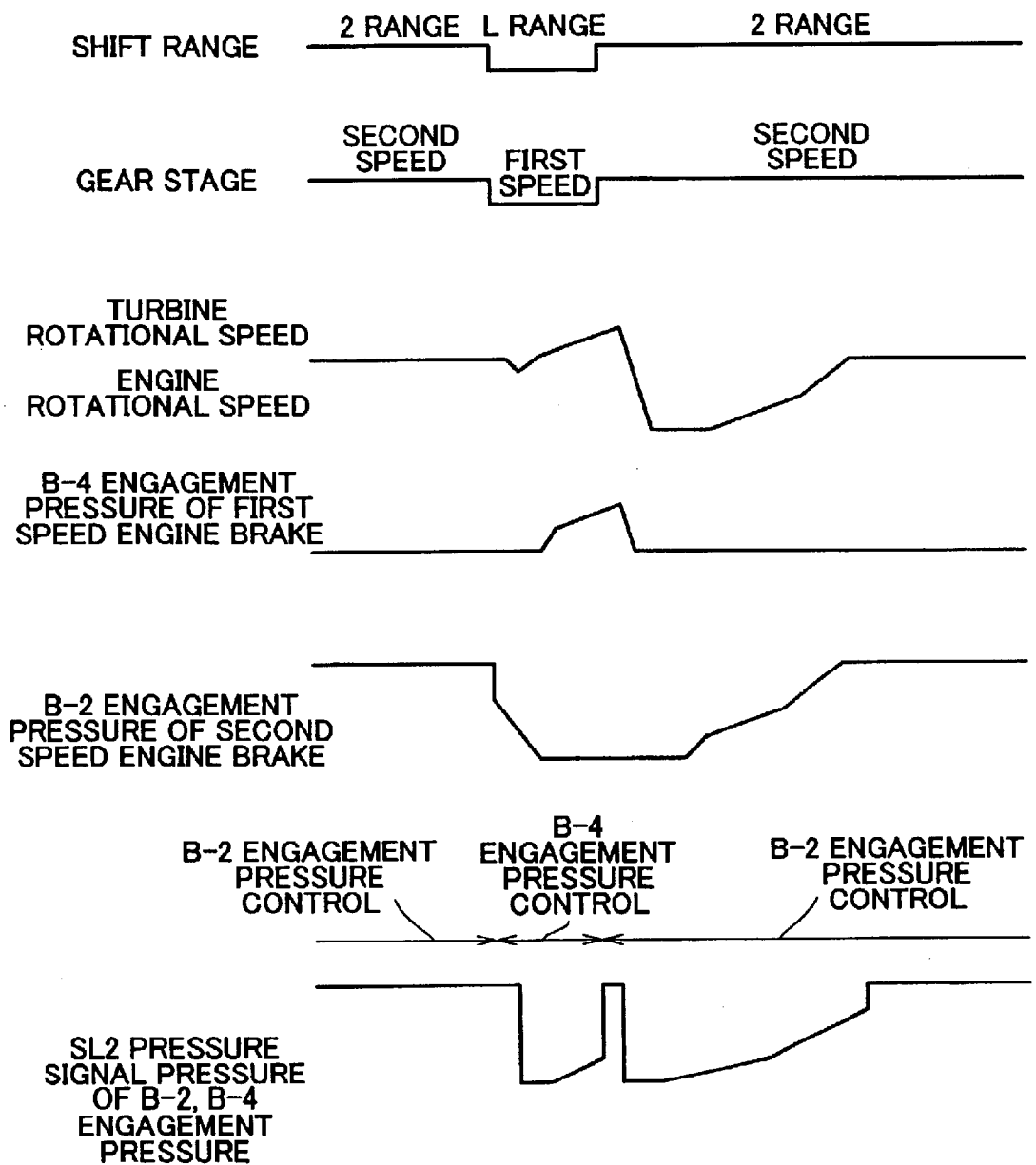
FIG. 7 is a timing chart (2) describing an operation example of a control device of an automatic transmission according to a related art.

A timing chart in this case will be described with reference to FIG. 5. The gear stage shifts from second speed to first speed in connection with the shift range changing from 2 range to L range. At this time, the linear solenoid (SL2) 602 changes from B-2 engagement pressure control to B-4 engagement pressure control. The shift solenoid (SL2) 602 executes B-4 engagement control and gradually increases the signal pressure until the gear stage is in the midst of shifting from second speed to first speed and a shift range change demand from L range to 2 range is received.

During this, if a shift demand for a shift from first speed to second speed is detected (YES in step 100), since the automatic transmission is in the midst of shifting from second speed to first speed (YES in step 200), the timer is started (step 300). In addition, the ECT_ECU100 outputs the sweep down command to the linear solenoid (SL2) that is controlling the B-4 engagement pressure (step 400). At this time, in the B-4 engagement pressure control of the linear solenoid (SL2) 602, the signal pressure of the linear solenoid (SL2) 602 sweeps down. In connection with the sweep down of the linear solenoid (SL2) 600, the engagement pressure of the first speed engine brake friction element (B-4) 660 sweeps down.

When time has passed for the engagement pressure of the first speed engine brake friction element (B-4) 660 to sufficiently sweep down (YES in step 500) and the turbine rotational speed has reached near synchronization with second speed (YES in step 700), the second speed shift command is output from the ECT_ECU100 to the automatic transmission. At this time, the engagement pressure of the first speed engine brake friction element (B-4) 660 has sufficiently lowered, and even if the linear solenoid (SL2) 602 changes from B-4 engagement pressure control to B-2 engagement pressure control in this state, the first speed engine brake friction element (B-4) 660 will not suddenly release and thus, will not generate shift shock.

According to the automatic transmission control device in the embodiment of the invention, when the shift demand from first speed to second speed is detected while shifting from second speed to first speed, it controls the electric current value for the linear solenoid (SL2) and the engagement of the first speed engine brake friction element (B-4) which is shifting, and gradually releases the first speed engine brake friction element (B-4) by sweeping down the signal pressure. When the first speed engine brake friction element (B-4) sufficiently sweeps down, and the turbine rotational speed reaches near synchronization with second speed, the ECT_ECU100 outputs the second speed shift command. Thus, in the case of multiple shift demands generated, the engagement pressure can be lowered by sweep down without generating shift shock and without waiting for the engagement of the engine brake friction element to finish while changing speeds, thereby enabling excellent responsiveness to shift demands from the driver.

Also, in the control device, the predetermined time measured once multiple speed changes are detected is set to an amount of time in which sweep down is completed and the first speed engine brake friction element is released based upon the time reduction rate of the output oil pressure, or to an amount of time that is a past time in which there was sufficient sweep down and little generation of shift shock. Thus, even if a new shift demand is generated during shifting, the output oil pressure of the linear solenoid valve is swept down, and it is possible to output a shift command from first speed to second speed in a state that does not generate shift shock.

In addition, according to the control device, even if shifting from first speed to second speed is performed when multiple speed changes have been detected and a predetermined time has passed, shift shock is reduced because the first speed engine brake friction element is not engaged, or not sufficiently engaged, due to sufficient sweep down of output oil pressure from the linear solenoid valve. Also, when the turbine rotational speed becomes a rotational speed corresponding to a synchronized rotational speed of the second speed gear stage (for example, a rotational speed within 10% of the synchronized rotational speed), shift shock to the second speed is reduced. When these time and turbine rotational speed conditions are fulfilled, a command portion can output the shift command from first speed, which is a second gear stage, to second speed, which is a first gear stage, and shift shock is reduced.

In addition, according to the control device, it is possible to reduce shift shock, in addition to achieving excellent response to driver shift demands, with respect to multiple speed changes demanded by the vehicle driver through manual operation.

In addition, according to the control device, for example, the engine brake friction element that generates an engine brake during first speed, and the engine brake friction element that generates an engine brake during second speed are connected to one shift valve. The shift valve is connected to the linear solenoid valve. The control portion controls the oil pressure supplied from the linear solenoid valve to the shift valve by changing the electric current value assigned to the linear solenoid valve. The control method is as follows. In a detecting step, for example, when a shift demand for a shift from first speed to second speed is generated during shifting from second speed, which is a first gear stage, to a higher speed, which is a second gear stage, in a valve control step, the control method controls a command electric current value for the solenoid valve such that the time reduction rate of the output oil pressure from the linear solenoid valve to the shift valve becomes equal to or less than a predetermined value. Thereafter, in the control method, shifting from the second speed to the first speed is commanded in a command step when a predetermined time has passed since the detection of multiple speed changes. Thus, when a new shift demand is generated during shifting, the engine brake friction element is not released after engagement is complete; instead, even if shifting is not finished, the oil pressure supplied to the linear solenoid valve is swept down and the engine brake friction element is released. Before the engagement of the engine brake friction element is completed during shifting, the engine brake friction element is released; therefore, excellent response to demands from the vehicle driver is achieved. Also, the generation of shift shock is reduced because the first speed engine brake friction element is slowly released through the sweep down of the oil pressure supplied from the linear solenoid valve to the shift valve. As a result, there is little shift shock in the automatic transmission during multiple speed changes, and shifting responds excellently to the shift demands from the vehicle driver.

In addition, according to the control device, the predetermined time measured since the detection of multiple speed changes is set to the time when sweep down is completed, and the first speed engine brake friction element is released based upon the time reduction rate of the output oil pressure, or a time before that time when there was sufficient sweep down and little generation of shift shock. Therefore, when a new shift demand is generated during shifting, the output oil pressure of the linear solenoid valve is swept down, and it is possible to output the shift command from first speed to second speed in a state where no shift shock is generated.

In addition, according to the control device, when the predetermined time has passed since the detection of multiple speed changes, even if shifting from first speed to second speed, shift shock is reduced because the output oil pressure from the linear solenoid valve has been sufficiently swept down and the first speed engine brake friction element is not engaged, or is not sufficiently engaged. Also, when the turbine rotational speed becomes a rotational speed corresponding to the synchronized rotational speed of the second speed gear stage, shift shock to the second speed is reduced. The command portion is able to output the shift command from first speed, which is a second gear stage, to second speed, which is a first gear stage when these time and turbine rotational speed conditions are fulfilled, thereby providing a control method that can reduce shift shock.

In addition, according to the control device, it is possible to reduce shift shock, in addition to having excellent response to shift demands from the driver, with respect to multiple speed changes demanded by the vehicle driver through manual operation.

In the above embodiment, the condition to output the second speed shift command is such that a predetermined time has passed since the start of the timer, and the turbine rotational speed has reached a rotational speed near second speed synchronization. However, the condition is not limited to this, and only the predetermined time passing since the start of the timer may be the condition.

Further, in the above embodiment, the ECT_ECU100 is described as detecting a shift demand for a shift from L range to 2 range, however, it is not limited to this. For example, the ECT_ECU100 may detect a shift demand based upon an input signal input from the manual shift switch 400 shown in FIG. 1.

The embodiment disclosed above serves only as an example and should not be considered restrictive. The scope of the invention is illustrated by the scope of the claims and not by the above description, and meanings equivalent to the scope of the patent claims, as well as all changes within the scope are meant to be included.

What is claimed is:

1. An automatic transmission control device comprising:
    an automatic transmission including a plurality of engine brake friction elements operating engine brakes during engagement, and provided with
        a first gear stage connected to a first shift valve in which a first engine brake friction element among the plurality of engine brake friction elements is engaged and established, and
        a second gear stage connected to the first shift valve in which a second engine brake friction element among the plurality of engine brake friction elements is engaged and established;
    a linear solenoid valve connected to the first shift valve;
    a detecting portion that detects a shift demand towards the first gear stage and the second gear stage; and
    a control portion engaging and releasing the first engine brake friction element and the second engine brake friction element through the linear solenoid valve, and including
        a valve control portion that controls the solenoid valve such that a time reduction rate of an output oil pressure from the linear solenoid valve to the shift valve becomes equal to or less than a predetermined rate in response to the detection of a shift demand for a shift from the second gear stage to the first gear stage during shifting from the first gear stage to the second gear stage and
        a command portion that commands the automatic transmission with a shift command from the second gear stage to the first gear stage in response to a passage of a predetermined time since the detection of a shift demand for a shift from the second gear stage to the first gear stage.

2. The automatic transmission control device according to claim 1, wherein
    the predetermined time is determined based upon the time reduction rate of the output pressure.

3. The automatic transmission control device according to claim 2, further comprising:
    a rotational speed detecting portion that detects a turbine rotational speed, wherein
    the command portion commands the automatic transmission with the shift command from the second gear stage to the first gear stage in response to the passage of the predetermined time since the detection of the shift demand for the shift from the second gear stage to the first gear stage and the turbine rotational speed reaching a rotational speed corresponding to a synchronized rotational speed of the first gear stage.

4. The automatic transmission control device according to claim 3, wherein
    the rotational speed detecting portion detects the shift demand for the shift to the first gear stage or the second gear stage based upon a manual operation of the driver of the vehicle in which the automatic transmission is mounted.

5. The automatic transmission control device according to claim 2, wherein
    the rotational speed detecting portion detects the shift demand for the shift to the first gear stage and the second gear stage based upon a manual operation of the driver of the vehicle in which the automatic transmission is mounted.

6. The automatic transmission control device according to claim 1, further comprising:
    a rotational speed detecting portion that detects a turbine rotational speed wherein
    the command portion commands the automatic transmission with the shift command from the second gear stage to the first gear stage in response to the passage of the predetermined time since the detection of the shift demand for the shift from the second gear stage to the first gear stage and the turbine rotational speed reaching a rotational speed corresponding to a synchronized rotational speed of the first gear stage.

7. The automatic transmission control device according to claim 6, wherein
    the rotational speed detecting portion detects the shift demand for the shift to the first gear stage or the second gear stage based upon a manual operation of the driver of the vehicle in which the automatic transmission is mounted.

8. The automatic transmission control device according to claim 1, wherein
    the rotational speed detecting portion detects the shift demand for the shift to the first gear stage or the second gear stage based upon a manual operation of the driver of the vehicle in which the automatic transmission is mounted.

9. A control method of an automatic transmission including a plurality of engine brake friction elements operating engine brakes during engagement provided with a first gear stage in which a second engine brake friction element among the plurality of engine brake friction elements is engaged and established; and a second gear stage in which a first engine brake friction element among the plurality of engine brake friction elements is engaged and established; in which the first engine brake and the second engine brake are connected to a shift valve and the shift valve is connected to a linear solenoid valve, the control method comprising detecting a shift demand for a shift to the first gear stage or the second gear stage, controlling the engagement and release of the first engine brake friction element and the second engine brake friction element by controlling the linear solenoid valve, controlling the solenoid valve such that a time reduction rate of an output oil pressure from the linear solenoid valve to the shift valve becomes equal to or less than a predetermined rate in response to the detection of a shift demand for a shift from the second gear stage to the first gear stage during shifting from the first gear stage to the second gear stage, and commanding the automatic transmission with a shift command from the second gear stage to the first gear stage in response to the passage of a predetermined time since the detection of a shift demand for a shift from the second gear stage to the first gear stage.

10. The control method according to claim 9, wherein the predetermined time is determined based upon the time reduction rate of the output oil pressure.

11. The control method according to claim 10, further comprising:

detecting a turbine rotational speed, wherein the command directs the automatic transmission with the shift command from the second gear stage to the first gear stage in response to the passage of the predetermined time since the detection of the shift demand for the shift from the second gear stage to the first gear stage and the turbine rotational speed reaching a rotational speed corresponding to a synchronized rotational speed of the first gear stage.

12. The control method according to claim 11, wherein the detecting senses the shift demand for the shift to the first gear stage or the second gear stage based upon a manual operation of the driver of the vehicle in which the automatic transmission is mounted.

13. The control method according to claim 10, wherein the detecting senses the shift demand for the shift to the first gear stage or the second gear stage based upon a manual operation of the driver of the vehicle in which the automatic transmission is mounted.

14. The control method according to claim 9, further comprising:

detecting a turbine rotational speed, wherein the command directs the automatic transmission with a shift command from the second gear stage to the first gear stage in response to the passage of a predetermined time since the detection of a shift demand for a shift from the second gear stage to the first gear stage and the turbine rotational speed reaching a rotational speed corresponding to a synchronized rotational speed of the first gear stage.

15. The control method according to claim 14, wherein the detecting senses the shift demand for the shift to the first gear stage or the second gear stage based upon a manual operation of the driver of the vehicle in which the automatic transmission is mounted.

16. The control method according to claim 9, wherein the detecting senses the shift demand for the shift to the first gear stage or the second gear stage based upon a manual operation of the driver of the vehicle in which the automatic transmission is mounted.

\* \* \* \* \*